UNITED STATES PATENT OFFICE.

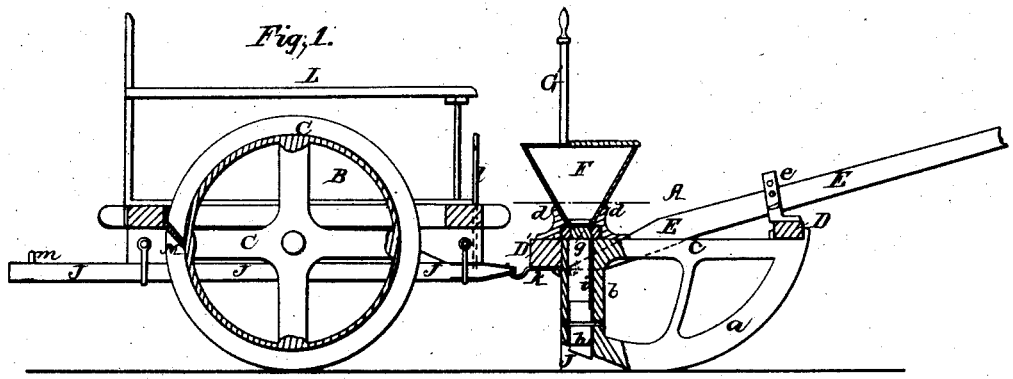
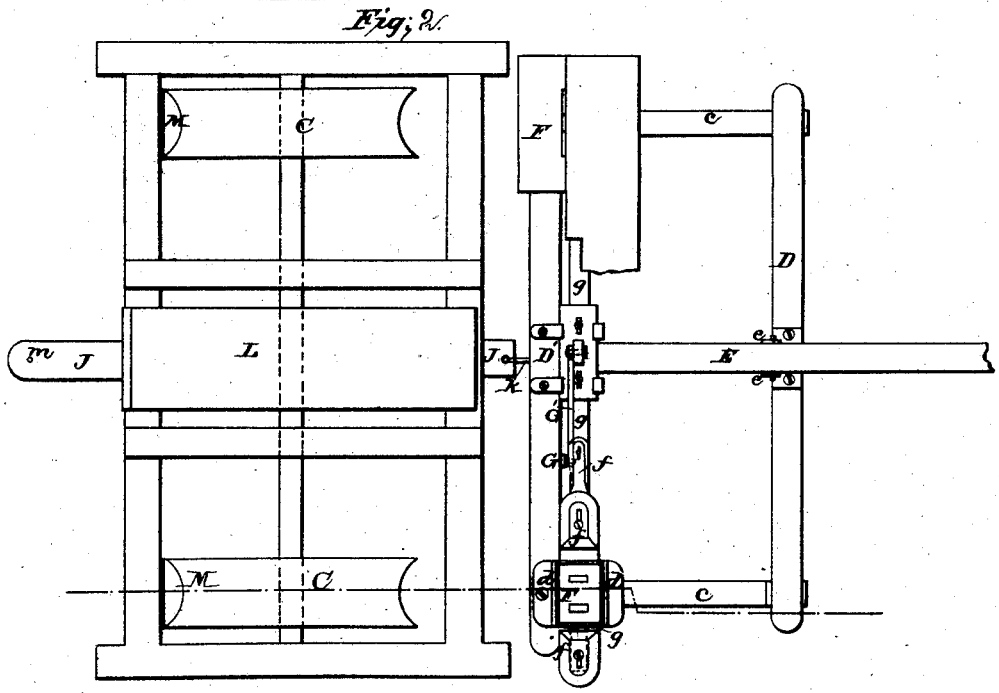
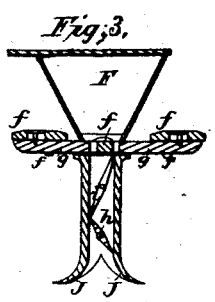

JOHN JOHNSON, OF NAPLES, ILLINOIS.

IMPROVEMENT IN CORN-PLANTERS.

Specification forming part of Letters Patent No. 28,490, dated May 29, 1860.

*To all whom it may concern:*

Be it known that I, JOHN JOHNSON, of Naples, in the county of Scott and State of Illinois, have invented a new and useful Improved Corn-Planter; and I do hereby declare that the following is a full, clear, and exact description thereof, reference being had to the accompanying drawings, forming a part of this specification, in which—

Figure 1 represents a vertical longitudinal section taken through the seed-dropping arrangement, through the two frames, and through one of the grooved covering-wheels. Fig. 2 is a plan view of my machine with a portion of the driver's seat removed, showing one hopper and the seed-slide. Fig. 3 is a vertical transverse section taken through one of the hoppers, a portion of the seed-slide, and the seed-tube.

Similar letters of reference in the three views indicate corresponding parts.

This invention consists in dividing the frame of the machine, arranging the seed device on one frame and the grooved pressing-wheels on the other, and connecting the two frames together by a sliding coupling, in the manner and for the purposes herein set forth.

To enable those skilled in the art to fully understand my invention, I will proceed to describe its construction and operation.

In the drawings, A represents the front frame of the machine, for carrying the seed-hoppers and slide, draft-pole, and openers; and B represents the hind frame, with a longitudinal middle and adjustable coupling-rod, and its two covering and pressing-wheels C C.

The earth is opened for receiving the seed by a curved-edge cutter, (one on each side of the machine,) consisting of a solid curved portion, $a$, a hollow perpendicular portion, $b$, forming the seed-tube, and a horizontal bar, $c$. To these shoes are suitably attached transverse beams D D', which serve to connect the shoes together. The front beam, D, connecting the ends of the two shoes, supports in the middle of its length the draft-pole E by two curved standards, $e$ $e$, which have perforations through them, through which is passed a bolt for keeping the pole in place, and by this arrangement, the rear end of the pole being pointed to the cross-beam D', the front of the frame or the shoes may be raised or depressed for regulating the depth of the seed, which operation will raise or depress the heel of the shoes in consequence of the curved shape of their cutters.

F F are seed-hoppers, which are connected to saddles $d$ $d$, secured to the bar D' and horizontal portions of the shoes over the perpendicular hollow shoe-standards $b$ $b$. Under the mouths of these hoppers play the seed-dropping devices, which are operated by a hand-lever, G, and pitman G'. They consist of six pieces—viz., two slotted portions, $f f$, and four adjustable bars, $g$ $g'$ $g$ $g'$. They are made adjustable longitudinally for the purpose of regulating the size of the orifices through which the seed falls into the tubes $b$ $b$. These portions, when put together and arranged in suitable guides, as represented by the drawings, form the seed-slide for depositing seed from the hopper into the tubes $b$ $b$ alternately.

Within the seed-tubes $b$ $b$, and near the bottoms of the same, are arranged valves $h$, which are vibrated alternately from one side of the tube to the other by rods $i$, which are connected with the seed-slide. These valves $h$ $h$ retain each charge of seed from the hopper until the proper time for dropping it into the ground. The object of this arrangement of valves placed in the bottom of the seed-tubes is to allow the seed to fall to the ground instantly the valves are opened. The seed may thus be dropped at regular intervals apart and at the proper time. The heel of each shoe is concave, and has two curved wings, $j$ $j$, spread out in such a manner that these wings will open the earth for the seed, and when it is dropped in the furrow the earth will fall back over the seed, covering them completely, at a depth to be regulated by the vertical adjustment of the draft-pole, as before described.

$k$ is a hooked plate bolted under the beam D', to one end of which the draft-pole is attached, and to its other end the rear frame is attached by an adjustable bar, J, which is strapped to the under side of this frame B and held in place by a pin, $l$, as shown in the drawings. A pin, $m$, projects up from its rear, and that prevents this bar from being drawn entirely out when the pin $l$ is withdrawn. This novel arrangement for connecting the two frames together is for the purpose of allowing the machine to be readily turned around, and at the same time bringing the wheels C C up as near to the heels of the seed-tubes as possible. By this arrangement the object may be effected in a very simple manner, for, turning the machine, it is only necessary to withdraw pin $l$, when the forward frame may be drawn some distance from the rear frame, and while in this state the machine can be turned short around. The wheels C C are for pressing the earth down upon the seed and for crushing clods, &c. The driver's seat L is placed on the rear frame, as shown by the drawings.

M M are fixed scrapers for clearing the grooved surfaces of the wheels C C.

Having thus described my invention, what I claim, and desire to secure by Letters Patent, is—

The combination, with a divided frame, A B, of the adjustable or extension bar J, jointed to the front part of the machine, and arranged in the manner and for the purposes herein set forth.

JOHN JOHNSON.

Witnesses:
JOSEPH CARTER,
A. J. BAKER.